United States Patent [19]

Miller et al.

[11] Patent Number: 4,635,045

[45] Date of Patent: Jan. 6, 1987

[54] FAILED FUSE DETECTOR AND DETECTING METHOD FOR ROTATING ELECTRICAL EQUIPMENT

[75] Inventors: Robert C. Miller, Penn Hills; Dale I. Gorden, Pittsburgh, both of Pa.

[73] Assignee: Westinghouse Electric Corp., Pittsburgh, Pa.

[21] Appl. No.: 219,095

[22] Filed: Dec. 22, 1980

[51] Int. Cl.[4] ............................................. G08B 21/00
[52] U.S. Cl. .................................. 340/638; 310/68 D; 340/639; 363/53
[58] Field of Search ........................ 340/638, 639, 645; 310/68 R, 68 B, 68 D; 361/104; 363/50, 52, 53

[56] References Cited

U.S. PATENT DOCUMENTS 3,030,531  4/1962  Lessmann ............................... 310/68
3,866,196  2/1975  Mann et al. ........................... 340/638

Primary Examiner—James L. Rowland
Assistant Examiner—Daniel Myer
Attorney, Agent, or Firm—G. H. Telfer

[57] ABSTRACT

A method and arrangement of apparatus is provided for remotely and selectively determining the existence of a failed fuse in the rectifier circuit of a brushless exciter rotor. A current transformer is disposed about each fuse in such a way that uses the conductor which carries current to the fuse as the primary winding of the current transformer. A light emitting diode is connected in series with the secondary winding of the current transformer. The emitted light, indicating a current flow through the fuse, is sensed by a stationary photodetector. This method senses the existence of a current flow through the exciter fuses and thereby positively determines each fuse that has not failed. Electronic circuitry is used to synchronize the detection operation with the rotation of the brushless exciter rotor so that each fuse is inspected at a time when it is expected to be carrying its maximum current. Since this method looks for the existence of current through each fuse, it operates in a failsafe manner.

23 Claims, 5 Drawing Figures

FAILED FUSE DETECTOR AND DETECTING METHOD FOR ROTATING ELECTRICAL EQUIPMENT

BACKGROUND OF THE INVENTION

The present invention relates to the selective detection and identification of fuse failures in situations where the fuses being monitored are fixed to a rotating device such as a brushless exciter used with an electrical generator. Typically, brushless exciters have many fused circuits whose conductivity are important for the proper functioning of the exciter and corresponding generator.

Brushless exciters have been in development and use since 1950. Their basic function is to generate an alternating current and convert this alternating current to a direct current that is used to produce the rotating field for electrical generators. This is accomplished by rectification of the alternating current with multiple diode circuits which are rigidly mounted to the brushless exciter's rotor. For a six phase wye double-way system, at least six diodes are required but many more are normally used due to spare legs required, multiple-pole designs and very high current requirements. Where high current capabilities are needed, many diodes are connected in parallel to reduce the current flow in any individual diode.

To protect these diodes from degradation due to overcurrent applications and to protect the exciter's operation from the effects of a shorted diode, typical designs include fuses in series with the diodes. In applications that utilize many fuses in parallel the failure of a single fuse may not have a deleterious effect on the fuses that are connected in parallel with it. Although each of the remaining parallel fuses will be required to carry an increased current load, this overcurrent is usually within the design capability of the fuses. However a single fuse failure, while not adversely affecting the performance of the brushless exciter, cannot be ignored for long periods of time since the other fuses are working under a slight overcurrent condition and any subsequent fuse failure could have serious effects on the brushless exciter's ability to function properly.

Implicit in the above discussion is the fact that, if multiple fuse failures occur, the operator may want to shut the exciter down in an orderly fashion and replace the failed fuses. Furthermore, if an entire phase of fuses fails, an immediate emergency shutdown of the system will be required in order to prevent further damage to the system.

For these reasons it is important to be able to determine not only if any fuses have failed, but how many have failed and the specific locations in the circuit of the failed fuses. Since brushless exciter rotors usually rotate at either 1800 RPM or 3600 RPM, the linear velocity of its peripherally mounted diodes and fuses is very high, making an inspection by an operator impossible without the aid of specially designed equipment.

Attempts to aid the operator in this function have generally approached the problem in one of two ways. The first technique involves the use of some means to create a visible signal when a fuse fails. One such device is disclosed in Mann, et al U.S. Pat. No. 3,866,196 which utilizes a projectile that, upon a fuse failure, is allowed to extend radially from the surface of the exciter rotor and be observed through the use of stroboscopic light. The Mann device utilizes a retaining wire to hold the projectile in place. This wire is connected electrically in parallel with the fuse and, when the fuse fails, the current has to pass through the retaining wire, causing it to overheat, rupture and release the projectile.

The idea of using a current path parallel to the fuse to activate a visible signal upon a fuse failure is also disclosed in Lessmann U.S. Pat. No. 3,030,531 which, instead of rupturing a retaining wire, uses the parallel current to activate a lamp which can be observed with stroboscopic light. The Lessmann disclosure further anticipates the use of a transparent fuse, instead of a lamp, wherein the transparent fuse is burnt when the current passes through it and the burnt condition is readily visible with stroboscopic light.

In summary, this first of two techniques involves the utilization of some device connected in parallel with each fuse in such a way that very little current flows through the device when the fuse is operating properly but, when the fuse blows, the device must carry a portion of the current that normally would flow through the fuse and this added current activates a signal which can be viewed with stroboscopic light. These methods all require that the design of the brushless exciter rotor itself be modified to include the signal device and that the operator make a deliberate investigation of the device with the aid of stroboscopic light.

The second of the two general techniques to assist the operator in discovering failed fuses requires neither a rotor design modification nor a deliberate investigation by the operator. This method, as disclosed and claimed in a copending application of W. H. South, Ser. No. 197,732, filed Oct. 16, 1980, and assigned to the Westinghouse Electric Corporation, utilizes the magnetic field generating property of electric currents to enable the remote selective determination and identification of failed fuses. The South device operates on the principle that, if a fuse is conducting an electric current, a magnetic field will exist around it and will move with the fuse as the exciter rotor rotates. This magnetic field can be remotely sensed by various devices and the conducting status of each fuse can be determined. Since any specific diode and its associated fuse do not conduct current during the entire 360 degrees of rotation of the exciter rotor, the South disclosure further devises a means to selectively activate fixed magnetic field sensors that are disposed about the rotor at locations where the various fuses are, by design, expected to have current flowing through them. Further, electronic circuitry allows for automatic display, alarm and shutdown sequences to be incorporated within the South device.

This second type of method for detecting failed fuses has the significant advantages of not requiring a portion of the detection device to be part of the exciter rotor design and eliminating the need for the operator to make a deliberate inspection of the failed fuse signalling devices. It also has the important characteristic of being failsafe. Instead of responding to the absence of current flowing through the fuse it senses the presence of current flowing through it. This aspect becomes significant under two circumstances. First, if the diode itself fails in a way that creates an open circuit its associated fuse and detection device will not be subjected to a current and thus, if that current is a requirement for a failed fuse indication, the detection system will not properly indicate a malfunction. Second, if the signalling device itself fails, the absence of the signal will indicate a properly operating fuse under all conditions. Typical of this latter situation is a faulty electrical connection in the Mann device or a faulty lamp in the Lessmann device. The South device eliminates these two problems by sensing the proper flow of current when it is expected and therefore, if the sensing mechanisms fail, it would signal a fuse failure when none existed thus failing safely.

Certain brushless exciter designs do not lend themselves readily to the application of remote sensing as described in the South disclosure. The South invention utilizes devices that sense the existence of the magnetic field that surrounds a conductor through which current is flowing. However, where a brushless exciter design has other nearby conductors that carry current in the opposite direction at the same time the effect is the cancellation of the magnetic field. Even in situations where the field isn't totally cancelled, a signal may be so weakened so as to make the South device inefficient in operation.

The purpose of the present invention is to provide the primary advantage of automatic fuse failure detection as described in the South device while eliminating the problems associated with cancelled magnetic fields due to other nearby conductors carrying current in the opposite direction.

SUMMARY OF THE INVENTION

The present invention provides a means for selectively determining the conducting status of the fuses and their associated diodes of a brushless exciter remotely without regard to the physical position of other conductors to the fuses being monitored. It requires only a slight modification to the brushless exciter rotor itself and eliminates the requirement of a deliberate visual inspection of the exciter to determine the existence of a failed fuse.

Since the diodes of the brushless exciter rotor serve to rectify an alternating current, the current flowing through any specific diode varies greatly as a function of time. The amount of current flowing through a diode at any given time is a function of the rotational position of the brushless exciter rotor at that time.

In order to isolate the current passing through a fuse and avoid the magnetic effects of other nearby conductors, a current transformer is positioned around each fuse in such a manner that the fuse itself is the primary winding of the current transformer. Connected in series with the secondary of the current transformer is a light emitting diode. The current transformers are mounted on each of the exciter fuses in a manner so that the light emitting diode points radially outward from the body of the exciter rotor.

The light emitting diode is rigidly fixed to the case of the current transformer and the transformer case is firmly mounted on the exciter fuse. The current transformer, light emitting diode and corresponding fastening techniques must be capable of withstanding the very high centrifugal forces associated with exciter components which travel at either 1800 RPM or 3600 RPM. These are the only parts of the present invention that are added to the standard brushless exciter rotor design.

When current passes through a fuse, which is the primary winding of the current transformer, a smaller proportional current will be induced in the secondary winding. Since the light emitting diode is in series with the secondary, light will be emitted when current is passing through both the fuse and its associated diode and will perform as a signal representing the conducting status of the fuse.

Photodetectors are positioned about the brushless exciter rotor at points where the fuses are carrying their highest currents. These positions vary depending on the particular fuse's position in the rectifying circuit but can be determined from the exciter design. Once determined, a fuse's maximum current carrying position will not significantly change. Since the rotor is rotating at a high speed, any specific fuse will be in a position adjacent to a photodetector for only a very short period of time. Therefore the photodetectors must be sampled at precisely the proper time in order to detect the light emission caused by the fuse's current flow when the fuse is directly under the photodetector. Otherwise, the photodetector may detect the light of another fuse or sense a complete absence of light due to the lack of any fuse at all within its sensing range. The present invention utilizes the high speed capabilities of electronics to determine the precise time at which each photodetector must be sampled and to store the results of each sampling operation for each fuse. In order to coordinate the rotation of the exciter shaft with the sampling of the photodetectors, a mark on the rotor shaft is used. All timing measurements are made relative to each subsequent appearance of the mark adjacent to a mark sensor. All angular positions are determined relative to this mark during each rotation of the exciter rotor. The electronic equipment that makes up part of the present invention determines the fuse which is to be checked during the next rotation, chooses the proper photodetector, measures the angular rotation of the rotor and samples the proper photodetector at a time when the chosen fuse is in a position proximate to that photodetector. The electronic equipment further retains the results of the sensing operations so that they may be indicated on a display panel for the operator and used in an alarm circuit which detects a fuse status indicating a lack of current through it, which is indication of a failed fuse.

BRIEF DESCRIPTION OF THE DRAWINGS

The invention will be more fully understood from the following detailed description of the preferred embodiment, read in conjunction with the accompanying drawings, in which.

DESCRIPTION OF THE PREFERRED EMBODIMENT

Figure 1:
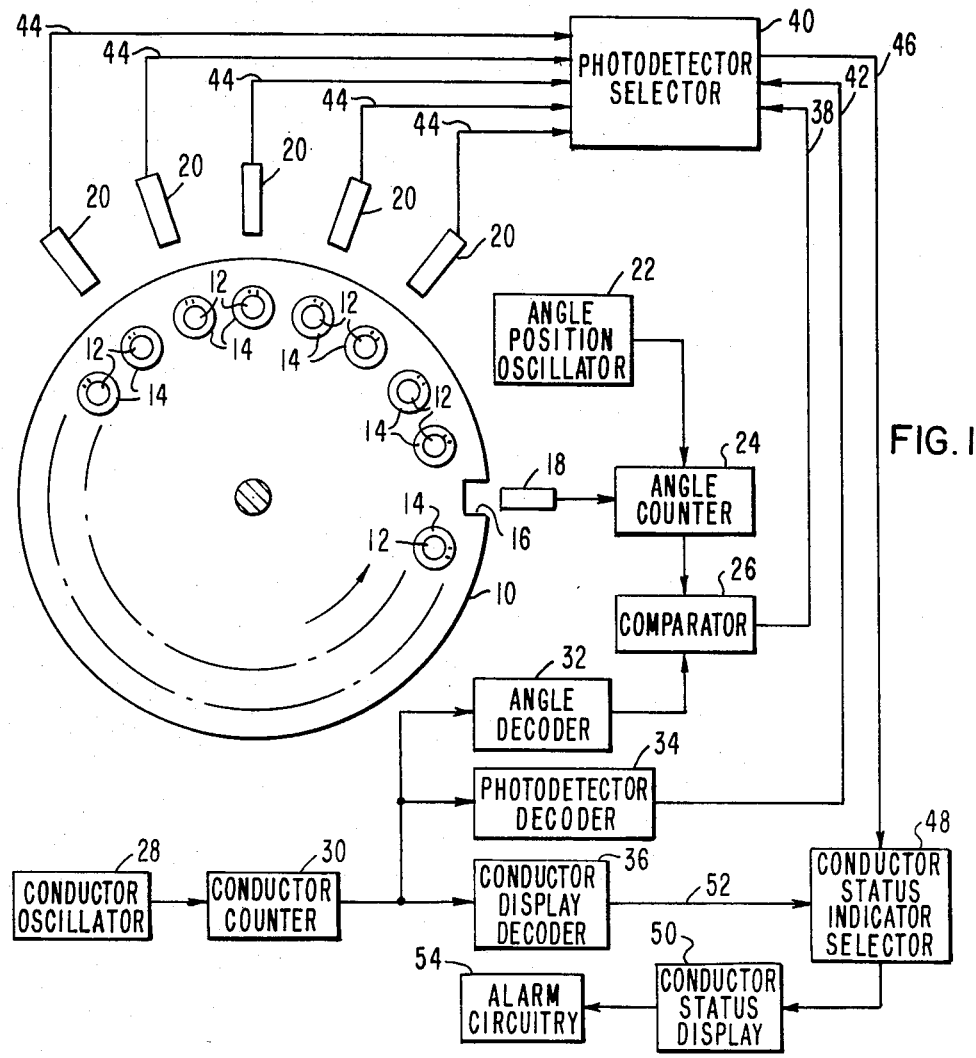
FIG. 1 is a schematic block diagram showing the failed fuse detector of the present invention.

FIG. 1 is a schematic diagram of the failed fuse detector of the present invention, including a cross section view of a brushless exciter rotor 10. A plurality of fuses 12 are shown rigidly attached to the rotor. Disposed about each fuse is a current transformer with attached light emitting diode in combination 14 as described herein and shown also in FIG. 4. The rotor includes a mark 16 shown as an indentation in FIG. 1, but which can be a raised portion or any other suitable mark that can be remotely sensed on each rotation of the rotor 10. A mark sensing device 18 is used for this purpose and is rigidly positioned in line with and proximate the circular path of the mark 16 followed during each rotation of the rotor 10. A plurality of rigidly mounted photodetectors 20 are disposed about the rotor in positions where the various fuses 12 are designed to attain their maximum currents. The required number and positions of the photodetectors are determined by the design of the brushless exciter rotor. The photodetector can be of various types, any of which having the capability to remotely detect the incidence of light directed toward its photosensitive surface. The only requirement of these photodetectors 20 is that they make possible the detection of the presence of light emission from the rotating light emitting diodes which are part of the current transformer and light emitting diode combination 14 and produce a corresponding output signal representing such an emission. Since this emission of light, in turn, indicates the flow of current through the associated fuse 12, the photodetector's output signal represents the conducting status of the associated fuse and its serially connected diode. The mark sensor 18 and photodetectors 20 are the only parts of the present invention that are required to be in close proximity to the brushless exciter rotor 10 and its fuses 12 while the current transformer and light emitting diode combination 14 is the only part of the present invention that is required to be attached to the brushless exciter rotor 10.

The operation of the photodetectors 20 is coordinated to the rotation of the rotor 10 by an angle position oscillator 22 which produces a constant stream of pulses at a preselected rate. For ease of operation the frequency of these pulses can be chosen to coincide with the degrees of rotation of the exciter rotor 10. For example, if the brushless exciter rotor is designed to rotate at 3600 RPM, a frequency of 21.6 KHz would produce one pulse from the angle position oscillator 22 for every 1 degree of rotation of the brushless exciter rotor 10. Obviously, any reasonable frequency of the angle position oscillator can be used, but this value was chosen because it allows for an acceptably accurate calibration procedure and is in accordance with standard angular measurement techniques which utilize 360 degrees per revolution.

The pulses from the angle position oscillator 22 cause the angle counter 24 to increment its stored counter value. This value is continuously output to a comparator 26. When the mark sensor 18 senses the mark 16 passing under its sensing head, the counter value of the angle counter is caused to be cleared to zero. Accordingly, the counter value would cyclically rise from zero to 360 and then be cleared again on each subsequent sensing of the mark 16 by the mark sensor 18. As can readily be seen, the counter value and the associated value sent to the comparator at any specific instant will be equivalent to the number of degrees of angular displacement of the rotor 10 from the reference position where its mark 16 was coincident with the mark sensor 18. This factor allows for the rotor's precise rotational position to be determined and a determination made of the occurrence of the proper angle at which a particular fuse 12 and its associated current transformer and light emitting diode combination 14 will be in position under the proper photodetector 20 for its current conducting status to be inspected.

In most brushless exciter applications it is not necessary to inspect each fuse 12 on each revolution of the rotor 10. Inspecting one fuse per revolution is satisfactory. Referring again to FIG. 1, the conductor oscillator 28 can be set to a preselectable frequency that determines the rate at which the present invention switches its attention from one fuse to the next. Each pulse from the conductor oscillator 28 causes the conductor counter 30 to increment its counter value and output this value to three mutually independent devices: the angle decoder 32, the photodetector decoder 34 and the conductor display decoder 36. When the counter value of the conductor counter 30 reaches the value equal to the total number of fuses to be tested it is reset to unity and begins the counting over again. If the rotor 10 is rotating at 3600 RPM, a frequency of 60 KHz for the conductor oscillator 28 will result in a change of the counter value of the conductor counter 30 once for each revolution of the rotor. This frequency and its corresponding rate of fuse inspections can easily be varied to suit the requirements of the brushless exciter application.

The angle decoder 32 receives the conductor count value and, based upon a predetermined scheme, determines the proper angle of the rotor that places that particular fuse 12 and its associated current transformer and light emitting diode combination 14 under its proper photodetector 20. The angle decoder 32 can consist of electronic circuitry or, alternatively, this function can be performed by a microprocessor. The output from the angle decoder is an angle value and this value is an input for the comparator 26. When the comparator 26 senses an equality between the value received from the angle counter 24 and the value received from the angle decoder 32, it produces an enabling pulse on the line 38 which is one input to a photodetector selector 40.

When the conductor counter 30 sends its counter value to the angle decoder 32 as described above, it simultaneously sends the same value to the photodetector decoder 34. The photodetector decoder receives this counter value and, based upon a predetermined scheme, determines the proper photodetector 20 which is positioned in a place where that particular fuse is expected to be carrying its maximum current. The coil decoder 34 produces a signal identifying this photodetector on the line 42 which is an input to the photodetector selector 40. The photodetector decoder 34 can consist of electronic circuitry or, alternatively, this function can be performed by a microprocessor.

The photodetector selector 40 has the ability to multiplex the many photodetector signals, which are available on lines 44, based on the value it receives on line 42 from the photodetector decoder 34. It performs this multiplexing function at such time that it receives an enabling pulse on line 38 from the comparator 26. The signal value, which is either "ON" or "OFF", that is received from the line 44 corresponding to the photodetector 20 identified by the value on line 42, as received from the photodetector decoder 34, is sent out from the sense coil selector 40 on line 46 to the conductor status indicator selector 48. The photodetector selector 40 can consist of electronic circuitry or, alternatively, this function can be performed by a microprocessor.

In order for the conductor status indicator selector 48 to properly display the status of each fuse 12 on the conductor status display 50 it receives a position signal from the conductor display decoder 36 on line 52. The counter value from the conductor counter 30 is received by the conductor display decoder 36 which, based on a predetermined scheme, determines the proper display element of the conductor status display 50 to be altered to reflect the appropriate conducting status for the fuse represented by the counter value which was last received from the conductor counter 30. The conductor display decoder 36 can consist of electronic circuitry or, alternatively, this function can be performed by a microprocessor.

The function of the conductor status indicator selector 48 is to obtain the conducting status signal from line 46, match it with the indicator identification signal from line 52 and store the results until the next sensing operation is performed on the same fuse at which time the storing means is updated to reflect the most recent sensing test for the particular fuse. This function can be accomplished by appropriate circuitry or, alternatively, this function can be performed by using a microprocessor.

In order to indicate the most recent conducting status of each fuse, a conductor status display 50 contains a visual indicator for each fuse of the brushless exciter rotor 10. These indicators can be lamps or other types of annunciators capable of clearly and unambiguously informing the operator of the conducting status of each fuse.

To relieve the operator of the need to constantly inspect the conductor status display 50, alarm circuitry 54 can readily be connected to the display to sound an alarm upon the discovery of a nonconducting fuse. It is anticipated that at least two levels of alarm severity will be utilized. First, a single fuse failure can be responded to by merely attracting the operator's attention with an additional lamp or horn. However, the alarm circuitry should be capable of responding to multiple failures (as when an entire phase of fuses fails) by automatically shutting the brushless exciter down completely to prevent further damage. Depending on the brushless exciter application, many such levels of alarm severity can be designed into the alarm circuitry.

Figure 2:
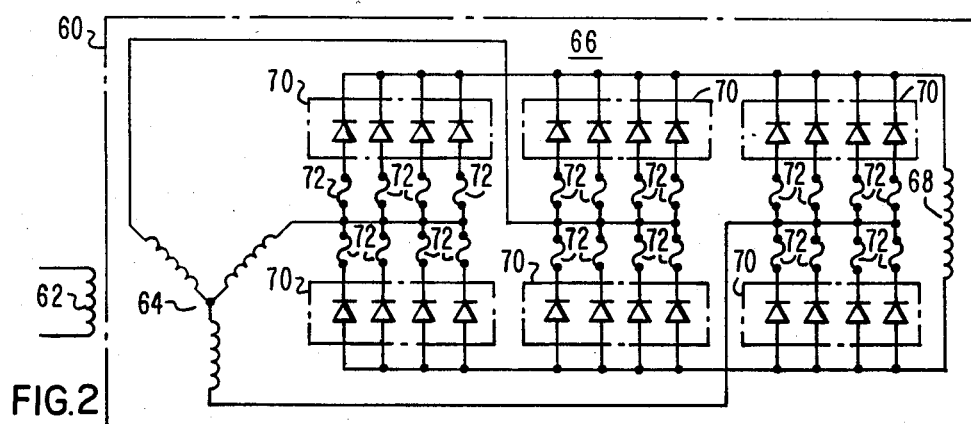
FIG. 2 is a simplified schematic diagram showing an exemplary brushless exciter system.

In order to more specifically describe the present invention an exemplary brushless exciter rotor 60 and field winding 62 is shown schematically in FIG. 2. The rotating components are shown enclosed by a dash line outline, including a three-phase armature winding 64, a rectifier assembly 66 and a field winding 68. A stationary direct-current field 62 is supplied within which the armature 64 rotates, generating three-phase alternating current in the three-phase windings shown. The resultant alternating current is rectified by the rotating rectifier assembly 66 thereby applying direct-current voltage to the field winding 68 which is part of the turbine generator rotor. The rectifier circuit consists of at least six diode groups 70, shown in FIG. 2 consisting of four individual diodes arranged in parallel within each diode group. The actual number of these diode groups will depend on the number of phases incorporated in the brushless exciter design. The number of individual diodes within each diode group depends on the current carrying requirement of the specific brushless exciter design. Each individual diode is connected in series with a fuse 72 for protection from overcurrent conditions. The individual fuses that comprise the fuse groups 72 in FIG. 2 are depicted individually as item 12 in FIG. 1.

It is apparent from the schematic of FIG. 2 that each diode group 70 will be subjected to a current flow for only 120 degrees of mechanical rotation. This total 120 degree conducting angle will be divided into as many smaller equal segments as there are pole pairs in the machine. For example, a six pole pair (12 pole) brushless exciter design will subject each diode element to six conducting paths which are 20 degrees in duration and separated by 40 degrees of nonconducting. This characteristic enables the exact identification of a position of rotation in the middle of one of these conducting segments where each diode is designed to be carrying its maximum current. This position is the most opportune point at which to sense whether the diode is actually conducting a current since it allows the photodetector 20 of FIG. 1 to be set at a lowest practical sensitivity level.

Figure 3:
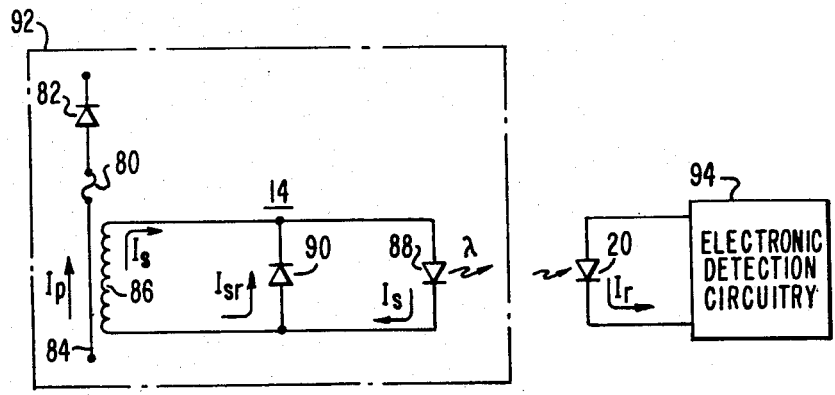
FIG. 3 is a simplified schematic diagram showing the application of the current transformer and light emitting diode combination of the present invention to one fuse-diode combination of a typical brushless exciter system. Also shown is the photosensitive device of the present system.

FIG. 3 schematically shows one fuse 80 from the group of fuses 72 depicted in FIG. 2. In series with each fuse is a diode 82, also shown in FIG. 3, which is a single member of the diode group 70 shown in FIG. 2. FIG. 3 also shows the current transformer and light emitting diode combination 14 which is disposed about the fuse 80 in such a way that the conductor which carries current to the fuse forms the primary winding 84 of the current transformer and light emitting diode combination 14.

Also referring to FIG. 3, it can be seen that when a current is flowing through the fuse 80, it is the primary current $I_p$ of the current transformer and light emitting diode combination 14 and causes the secondary current $I_s$ to flow in the secondary winding 86 and light emitting diode 88 as shown. Thus, the flow of current through the fuse 80 and diode 82 will cause the emission of light from the light emitting diode 88. In order to prolong the useful life of the light emitting diode 88, another circuit diode 90 is connected with the opposite polarity in parallel to the light emitting diode 88 to protect it when current is flowing in the opposite direction, $I_{sr}$, as would occur during the period when the primary current, $I_p$, is decreasing and the induced field in the current transformer secondary winding 86 is collapsing. The diode 82, fuse 80 and current transformer and light emitting diode combination 14 are all fixed to the brushless exciter rotor and therefore rotating with it. The rotating portion of FIG. 3 is enclosed by a dashed line 92.

The non-rotating portion of FIG. 3 includes the photodetector 20 which produces a resultant current, $I_r$, when light falls on its photosensitive surface. This resultant current $I_r$, produces the signal, described above, which is carried on line 44 of FIG. 1. The electronic detection circuitry 94 shown in simplified form in FIG. 3 would include the electronic devices described above and shown in greater detail in FIG. 1.

Figure 4:
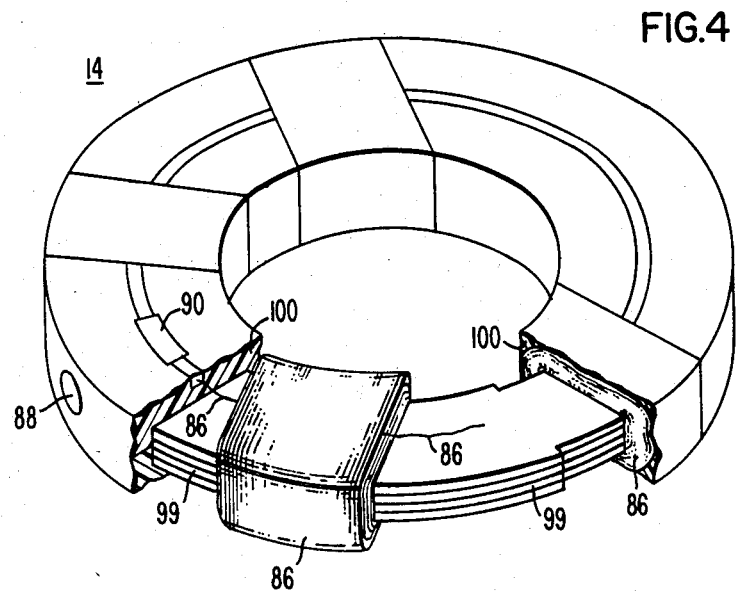
FIG. 4 is a depiction of one possible method of constructing the current transformer and light emitting diode combination of the present invention.
Figure 5:
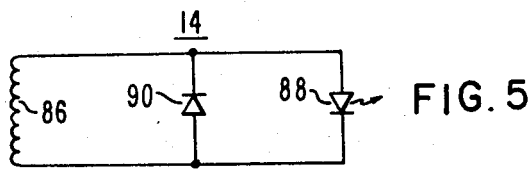
FIG. 5 shows the circuit schematic of the current transformer and light emitting diode combination of the present invention along with diode protection.

FIG. 4 shows one of several possible configuration of the current transformer and light emitting diode combination 14 described above. A typical configuration consists of a toroid with the secondary winding 86 wound about it. The light emitting diode 88 can be mounted in any suitable way that allows the configuration to be disposed about the brushless exciter fuse with the light emitting diode 88 pointing outward from the brushless exciter rotor and withstand the very high centrifugal forces associated with brushless exciter components. An electrical schematic of the combination 14, shown in FIG. 4, is depicted in FIG. 5 with the protecting diode 90 shown connected with opposite polarity in parallel with the light emitting diode 88. In order to increase efficiency, the light emitting diode 88 can be of the infra-red type. This reduces heat loss, thereby increasing the intensity of the light output. Also in FIG. 4, the protective circuit diode 90 is shown in a small indentation proximate the light emitting diode 88. The circuit diode 90, as described above, is connected electrically in parallel with the light emitting diode 88. As set forth above, the light emitting diode 88 is connected electrically in series with the secondary winding 86 of the current transformer which is wound around a magnetic core 99. In applications that must withstand significant centrifugal forces, as in brushless exciters, the entire assembly 14 is potted in a material 100 with sufficient strength to limit motion of the individual components.

To one skilled in the art, it should be apparent that the present invention uses a current transformer in an atypical application. The current passing through the primary winding (reference numeral 84 in FIG. 3) of the current transformer is a direct, and not a conventional alternating, current.

Normally, a current transformer is not applied to direct current circuits. However, in the present invention use is made of the fact that the current flowing through the fuses is intermittent and, during its change from a non-conducting to a conducting state, there is a sufficient change in current flow as a function of time to cause a current to be induced in the secondary winding of the current transformer. Since this is an atypical application of a current transformer, certain parameters of the current transformer are critical to the present invention. First, the secondary winding must have enough turns to reduce the current flow through the light emitting diode to a value that is safely within its operating range. Secondly, the magnetic core of the current transformer must have enough material to prevent electromagnetic saturation during the period of time in which current is flowing through the fuse being inspected. This latter criterion must allow sufficient time, before saturation, for the light emitting diode to be detected by the associated equipment of the present invention as described above.

From the foregoing description, it should now be apparent that a new failed fuse detection means has been disclosed that is particularly useful in selectively determining the presence of a nonconducting fuse of a brushless exciter rotor. The novel device disclosed eliminates the need for deliberate operator inspection and a flowing current in parallel with the fuse being tested.

Though the invention has been described with a certain degree of particularity, it is to be understood that the present disclosure has been made only by way of example and that numerous changes in detail, combination and arrangement of components may be accomplished without departing from the spirit and scope of the present invention. For example, the present invention could be disposed about the diode or any other conductor in series with the fuse and diode and need not be mounted to or disposed about the fuse itself as described above. It should be apparent from the above discussion that a failed fuse indicator has been provided that selectively detects the failure of one or more fuses on a brushless exciter rotor. It should also be apparent that although certain illustrative embodiments have been shown and described, the present invention is not so limited that other embodiments and modifications are not possible and that although the invention has been described with reference to fuses of a brushless exciter rotor, the utility of the present invention is not so limited and is applicable to any conductor on any type of rotating equipment.

To one skilled in the art, it should be further obvious that although the present invention has been described above with considerable detail concerning the method of selectively determining the particular fuse being monitored at any given time, a simpler, less sophisticated system could comprise the use of a standard oscilloscope connected to the output of the photodetector described above. Although this type of application would severely limit the automated nature of the present invention described above, it is clearly within its scope.

What we claim is:

1. A brushless exciter with a failed fuse detector, comprising:
a rotating member of said brushless exciter;
a plurality of diodes fixed to said rotating member and arranged in a manner which rectifies alternating current and produces a direct current field for excitation of a turbine generator;
a plurality of fuses fixed to said rotating member with each of said fuses connected in series with one of said diodes;
a plurality of current transformers fixed to said rotating member and disposed individually about each of said fuses;
a plurality of light emitting diodes fixed to said rotating member and individually connected in series with the secondary winding of each of said current transformers;
a plurality of stationary photodetectors disposed about said rotating member proximate the circular path of said light emitting diodes described during rotation of said rotating member; and
means for synchronizing the use of the photodetectors with the rotation of the rotating member to enable the selective determination of the conducting status of each of said fuses.

2. The combination of claim 1, wherein:
said synchronizing means comprises means for determining the instantaneous angular displacement of the rotating member and relating that displacement to a reference position of said rotating member.

3. Apparatus for selectively determining the conducting status of a plurality of conductors which are rigidly attached to a rotating device, comprising:
a plurality of current transformers fixed to said rotating device and disposed individually about said conductors;
a plurality of light emitting diodes fixed to said rotating device and individually connected in series with the secondary of each of said current transformers;
a plurality of stationary photodetectors disposed about the circumference of said rotating member proximate the circular path of said light emitting diodes described during rotation of said rotating device; and
means for synchronizing the use of the photodetectors with the rotation of the rotating device to enable the selective determination and indication of the conducting status of each of said conductors.

4. The apparatus of claim 3, wherein the synchronizing means comprises:
a mark on said rotating device;

a stationary mark sensing means for remotely sensing said mark on the rotating device and producing a synchronizing signal when the mark proximately passes the mark sensing means;

an angle position oscillating means for producing output pulses at a preselectable frequency;

an angle counting means, whose inputs are the synchronizing signal and the output pulses of the angle position oscillating means, for producing an output which is a number representing the accumulated number of output pulses from the angle position oscillating means that have occurred since the most recent synchronizing signal, whereby said output number is a measurement of actual angular displacement of said rotating device relative to the angular position where said mark is proximate said stationary mark sensing means;

a plurality of current transformers fixed to said rotating device and disposed individually about each of said conductors;

a plurality of light emitting diodes fixed to said rotating device and individually connected in series with the secondary winding of each of said current transformers;

a plurality of stationary photodetectors disposed about the circumference of said rotating member proximate to the circular path of said light emitting diodes described during rotation of said rotating device;

a conductor oscillating means for producing output pulses at a preselectable frequency;

a conductor counting means, whose input is the output of the conductor oscillating means, for cyclically incrementing a conductor counter from unity to a value equal to the number of said conductors whose conducting status are to be sensed and whose output is a number equal to the value of said conductor counter;

an angle decoding means, whose input is the conductor number that is the output of the conductor counting means, for determining according to a predetermined scheme the proper angular displacement of said rotating device for determining the conducting status of the conductor represented by the conductor number, the output of said angle decoding means being a number representative of the proper angular displacement;

a comparator means for comparing two inputs, the actual angular displacement of the rotating device and the proper angular displacement for determining the conducting status of the conductor represented by the conductor number, and producing an enabling signal when the two inputs are identical;

a photodetector decoding means, whose input is the conductor number output of the conductor counting means, for determining the proper one of the plurality of photodetectors for sensing the conducting status of the conductor represented by the conductor number, based upon a predetermined scheme, and producing an output which is a number representing the proper one of the plurality of photodetectors;

a photodetector selecting means, whose inputs are the enabling signal and the output number produced by the photodetector decoding means, for producing an output signal equivalent to the output from the photodetector represented by the output from the photodetector decoding means when the enabling signal from the comparator indicates an equality between the actual angular displacement and the proper angular displacement for determining the conducting status of the conductor represented by the conductor number;

a conductor status indicator decoding means, whose input is the conductor number, for producing an output which is a number representing the physical location of the conductor on the rotating device represented by the conductor number;

a conductor status indicator selecting means, whose inputs are the output number from the conductor status indicator decoding means and the conducting status output from the photodetector selecting means, for retaining the most recent conducting status for each of the plurality of conductors and producing an output representing the conducting status of each of said conductors; and a displaying means for visually indicating the most recent conducting status of each of the plurality of conductors as received as an input from the output of the conductor status indicator decoding means.

5. The apparatus of claim 4, wherein:
said angle decoding means comprises a microprocessor.

6. The apparatus of claim 4, wherein:
said photodetector decoding means comprises a microprocessor.

7. The apparatus of claim 4, wherein:
said photodetector selecting means comprises a microprocessor.

8. The apparatus of claim 4, wherein:
said conductor status indicator decoding means comprises a microprocessor.

9. The apparatus of claim 4, wherein:
said conductor status indicator selecting means comprises a microprocessor.

10. A method for selectively determining the conducting capability status of a plurality of conductors which are rigidly attached to a rotating device, said method comprising:

marking a location on said rotating device in such a way that the marked location is able to be detected remotely;

detecting said mark remotely on each revolution of the rotating device when said mark passes a fixed point;

disposing a current transformer about each of said conductors;

connecting a light emitting diode in series with the secondary winding of each of said current transformers;

remotely sensing the output of said light emitting diode with a fixed photosensitive device;

synchronizing the selective application of the photosensitive devices to the angular position of the rotating device; and visually displaying the most recent conducting status of each of said conductors.

11. The method of claim 10, further comprising:
activating an alarm when one of said conductors has been sensed to have a nonconducting status.

12. The method of claim 10, further comprising:
shutting down said rotating device when a predetermined number of said conductors have been detected to have a nonconducting status.

13. A brushless exciter with a failed fuse detector, comprising:

a rotating member of said brushless exciter;

a plurality of diodes fixed to said rotating member and arranged in a manner which rectifies alternating current and produces a direct current field for excitation of a turbine generator;

a plurality of fuses fixed to said rotating member with each of said fuses connected in series with one of said diodes;

a plurality of current transformers fixed to said rotating member and disposed individually about each of said fuses;

a plurality of light emitting diodes fixed to said rotating member and individually connected in series with the secondary winding of each of said current transformers; and a stationary means for detecting the emission from said plurality of light emitting diodes.

14. The brushless exciter with a failed fuse detector of claim 13, further comprising:

means for selectively determining the conducting status of each of said plurality of fuses.

15. The brushless exciter with a failed fuse detector of claim 13, wherein:

a preselected one of said plurality of light emitting diodes is attached to a preselected one of said plurality of current transformers.

16. A brushless exciter with a failed fuse detector, comprising:

a rotating member of said brushless exciter;

a plurality of diodes fixed to said rotating member and arranged in a manner which rectifies alternating current and produces a direct current field for excitation of a turbine generator;

a plurality of fuses fixed to said rotating member with each of said fuses connected in series with one of said diodes;

a plurality of current transformers fixed to said rotating member and disposed individually about each of said fuses; and a plurality of light emitting diodes fixed to said rotating member and individually connected in series with the secondary winding of each of said current transformers.

17. The brushless exciter with a failed fuse detector of claim 16, further comprising:

a stationary means for detecting the emission from a preselected one of said plurality of light emitting diodes.

18. The brushless exciter with a failed fuse detector of claim 16, further comprising:

means for selectively determining the conducting status of a preselected one of said plurality of fuses.

19. The brushless exciter with a failed fuse detector of claim 16, wherein:

a preselected one of said plurality of light emitting diodes is rigidly attached to a preselected one of said plurality of current transformers.

20. An electric machine with a failed electrical circuit component detector, comprising:

a rotating member of said electric machine;

a plurality of electrical circuit components rigidly attached to said rotating member;

a plurality of current transformers rigidly attached to said rotating member and individually disposed about each of said electrical circuit components;

a plurality of light emitting diodes rigidly attached to said rotating member and individually electrically connected in series with the secondary winding of each of said current transformers; and a stationary means for detecting the emission of a preselected one of said plurality of light emitting diodes.

21. The electrical machine with a failed electrical circuit component detector of claim 20, further comprising:

means for selectively determining the conducting status of a preselected one of said plurality of electrical circuit components.

22. The electrical machine with a failed electrical circuit component detector of claim 20, wherein:

a preselected one of said plurality of light emitting diodes is rigidly attached to a preselected one of said plurality of current transformers.

23. The electrical machine with a failed electrical circuit component detector of claim 20, wherein:

said current transformer comprises a secondary winding of a sufficient number of turns to limit the magnitude of electrical current through said light emitting diode to prevent damage of said light emitting diode;

said current transformer comprises a magnetic core of sufficient material to prevent electromagnetic saturation of said core within the duration of current flow through a preselected one of said plurality of electrical circuit components; and said current transformer comprises a magnetic core of sufficient material to prevent electromagnetic saturation of said core within the time required for said selectively determining means to determine the conducting status of a preselected one of said plurality of electrical circuit components.

* * * * *